(12) United States Patent
Numata

(10) Patent No.: US 11,108,968 B2
(45) Date of Patent: Aug. 31, 2021

(54) IMAGE CAPTURING APPARATUS, METHOD FOR CONTROLLING IMAGE CAPTURING APPARATUS, AND CALCULATION METHOD FOR CALCULATING AN IN-FOCUS POSITION OF A FOCUS LENS BASED ON ESTIMATING COMPONENTS OF AT LEAST A FIRST WAVELENGTH BAND PASSING THROUGH AN OPTICAL FILTER AND OF A SECOND WAVELENGTH BAND

(71) Applicant: CANON KABUSHIKI KAISHA, Tokyo (JP)

(72) Inventor: Aihiko Numata, Inagi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/694,138

(22) Filed: Nov. 25, 2019

(65) Prior Publication Data
US 2020/0177781 A1 Jun. 4, 2020

(30) Foreign Application Priority Data
Dec. 3, 2018 (JP) .............................. JP2018-226720

(51) Int. Cl.
*H04N 5/232* (2006.01)
*H04N 5/235* (2006.01)
(Continued)

(52) U.S. Cl.
CPC ......... *H04N 5/2351* (2013.01); *G02B 26/023* (2013.01); *H04N 5/2254* (2013.01); *H04N 5/2353* (2013.01)

(58) Field of Classification Search
CPC .................................................... G02B 26/023
See application file for complete search history.

(56) References Cited

U.S. PATENT DOCUMENTS 9,325,886 B2 * 4/2016 Kim .................... H04N 5/22541
10,579,871 B2 * 3/2020 Xu .......................... H04N 5/332
(Continued)

FOREIGN PATENT DOCUMENTS

EP        3340603 A1    6/2018
JP     2001-045512 A    2/2001

OTHER PUBLICATIONS

Above patent documents were cited in a European Search Report dated Feb. 25, 2020, a copy of which is enclosed, that issued in the corresponding European Patent Application No. 19208688.2.

*Primary Examiner* — Gary C Vieaux
(74) *Attorney, Agent, or Firm* — Cowan, Liebowitz & Latman, P.C.

(57) ABSTRACT

An image capturing apparatus comprises: an image sensor; an optical filter having a first filter region that selectively passes light in a first wavelength band; and a calculation circuit that calculates an in-focus position of a focus lens based on a signal obtained from the image sensor. The calculation circuit estimates a first component in the first wavelength band and a second component in a second wavelength band of light received by a second pixel region of the image sensor excluding a first pixel region of the image sensor, based on a first signal obtained from the first pixel region that receives light passed through the first filter region and a second signal obtained from the second pixel region, and calculates an in-focus position with respect to a predetermined shooting distance based on the estimated first and second components.

29 Claims, 11 Drawing Sheets

(51) Int. Cl.
*G02B 26/02* (2006.01)
*H04N 5/225* (2006.01)

(56) References Cited

U.S. PATENT DOCUMENTS

| | | |
|---|---|---|
| 2007/0211155 A1 | 9/2007 | Numata |
| 2007/0285540 A1 | 12/2007 | Kwon et al. |
| 2013/0050453 A1 | 2/2013 | Bergstrom et al. |
| 2014/0078379 A1* | 3/2014 | Masuda ................ G01J 3/2823 348/360 |
| 2016/0198103 A1 | 7/2016 | Tanaka et al. |
| 2018/0045867 A1 | 2/2018 | Kunugise et al. |
| 2018/0227490 A1 | 8/2018 | Nakata et al. |
| 2020/0092482 A1* | 3/2020 | Tsuruyama .......... G01B 11/026 |
| 2021/0067719 A1* | 3/2021 | Cooper ................ H04N 5/2351 |

* cited by examiner

FIG. 2A
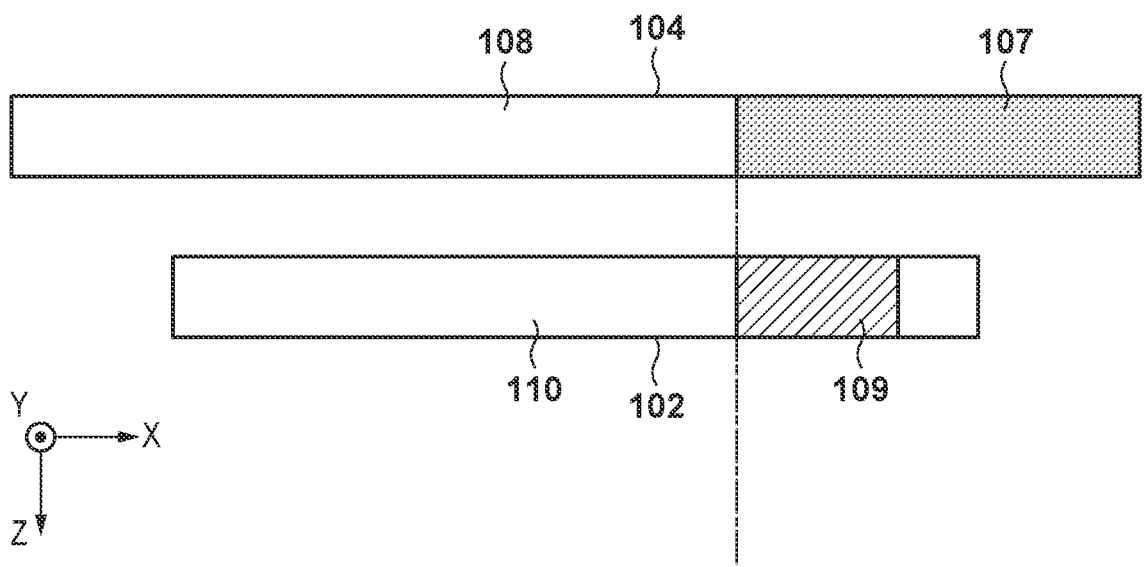
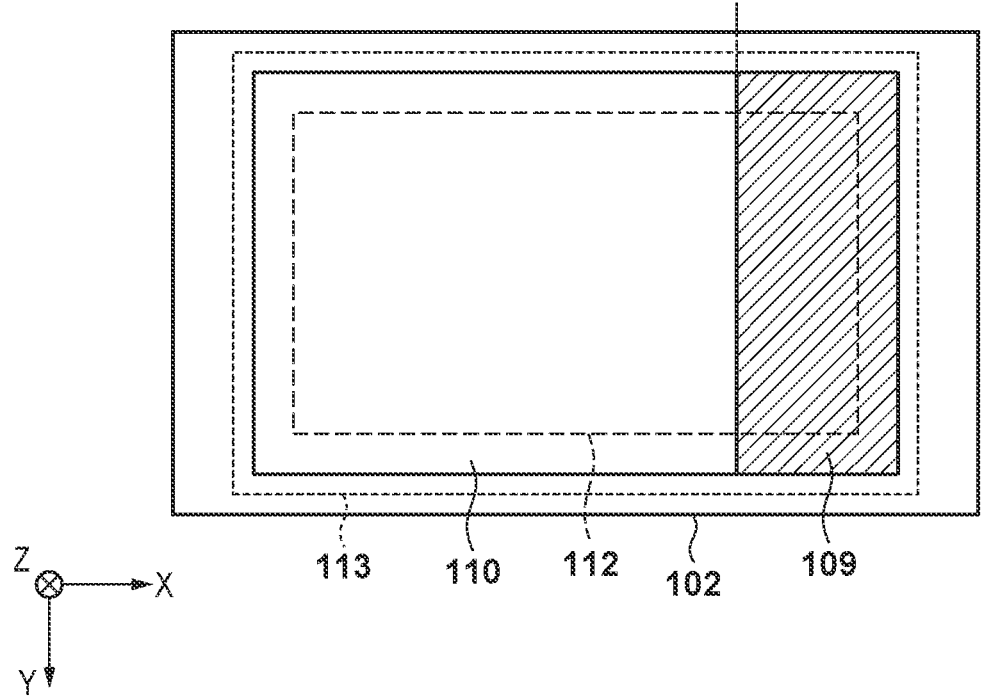
FIG. 2B

FIG. 3

| SHOOTING DISTANCE | FOCUS LENS POSITION WHEN VISIBLE LIGHT IS INCIDENT | FOCUS LENS POSITION WHEN INFRARED LIGHT IS INCIDENT |
|---|---|---|
| L_1 | PVI_1 | PIR_1 |
| L_2 | PVI_2 | PIR_2 |
| L_3 | PVI_3 | PIR_3 |
| ⋮ | ⋮ | ⋮ |

FIG. 6

| SHOOTING DISTANCE | FOCUS LENS POSITION WHEN VISIBLE LIGHT IS INCIDENT | FOCUS LENS POSITION WHEN NEAR-INFRARED LIGHT IS INCIDENT | FOCUS LENS POSITION WHEN SHORTWAVE INFRARED LIGHT IS INCIDENT |
|---|---|---|---|
| L_1 | PVL_1 | PNIR_1 | PSWIR_1 |
| L_2 | PVL_2 | PNIR_2 | PSWIR_2 |
| L_3 | PVL_3 | PNIR_3 | PSWIR_3 |
| ... | ... | ... | ... |

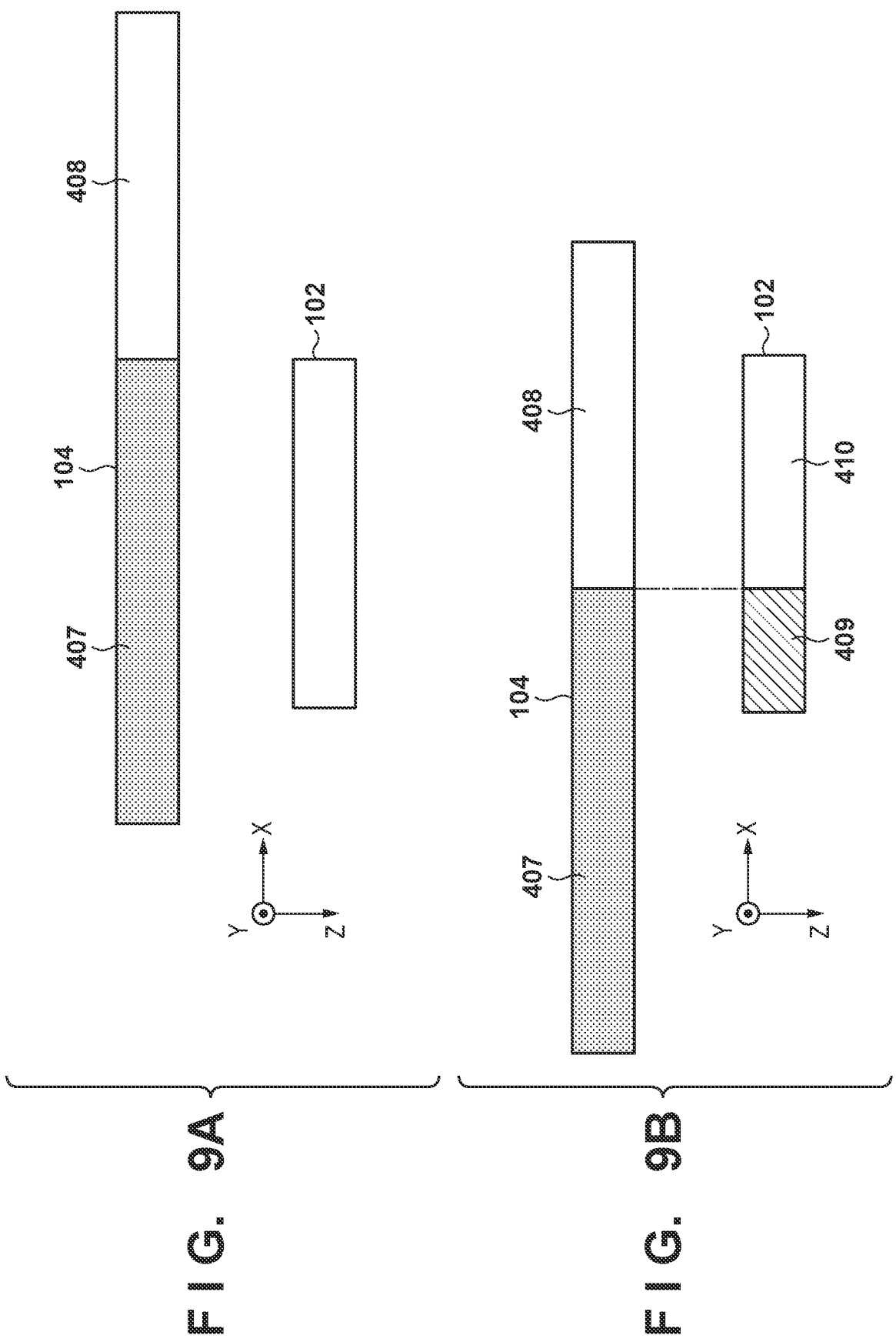

IMAGE CAPTURING APPARATUS, METHOD FOR CONTROLLING IMAGE CAPTURING APPARATUS, AND CALCULATION METHOD FOR CALCULATING AN IN-FOCUS POSITION OF A FOCUS LENS BASED ON ESTIMATING COMPONENTS OF AT LEAST A FIRST WAVELENGTH BAND PASSING THROUGH AN OPTICAL FILTER AND OF A SECOND WAVELENGTH BAND

BACKGROUND OF THE INVENTION

Field of the Invention

The present invention relates to an image capturing apparatus, a method for controlling an image capturing apparatus, and a calculation method.

Description of the Related Art

An image capturing apparatus for use in monitoring or the like is required to acquire a clear subject image even in low light, e.g. at nighttime. As an image capturing apparatus that enables a clear subject image to be acquired even in low light, an image capturing apparatus has been proposed that uses an image sensor that is sensitive not only to visible light but also to infrared light and enables captured images of visible light and infrared light to be captured (see Japanese Patent Laid-Open No. 2001-45512).

In some cases, an image capturing apparatus for use in monitoring or the like is required to continue to perform shooting with an in-focus position fixed, in order to continue to constantly monitor a specific shooting region. However, an ordinary imaging optical system has an axial chromatic aberration, and therefore the image-forming position differs depending on the wavelength of incident light. FIG. 12 shows a relationship (axial chromatic aberration) between the wavelength of light incident on an imaging optical system and an image-forming position, with the horizontal axis indicating the wavelength of light and the vertical axis indicating the image-forming position. As is understood from FIG. 12, the image-forming position differs depending on the wavelength of light incident on the imaging optical system, due to an axial chromatic aberration in the imaging optical system. Commonly, the greater the wavelength differs, the greater the image-forming position differs.

The wavelength of light incident on the imaging optical system is determined by the product of an illumination wavelength of ambient light and spectral reflectance of a subject (hereinafter, "wavelength of ambient light"). For this reason, if an image of a subject is shot with the position of a focus lens fixed, the in-focus position may change as the wavelength of ambient light changes. For example, an image capturing apparatus for use in monitoring that is installed at an entrance of a shop or a parking area is required to continue to perform shooting with the in-focus position placed in a specific shooting region (the entrance in this case). For example, an industrial image capturing apparatus for use in an assembly process in a factory and an in-vehicle image capturing apparatus for detecting obstacles are also required to continue to perform shooting with the in-focus position placed in a specific shooting region.

If shooting is performed with the position of the focus lens fixed, as with a conventional image capturing apparatus such as one described in Japanese Patent Laid-Open No. 2001-45512, there may be cases where a desired image cannot be acquired due to a shift in the in-focus position. In particular, in the case of capturing images of visible light and infrared light for the purpose of monitoring, the difference in the wavelength of ambient light is large, and thus, the in-focus position significantly shifts due to the illumination wavelength of ambient light and the spectral reflectance of a subject.

SUMMARY OF THE INVENTION

The present invention has been made in consideration of the above situation, and reduces the dependency of an in-focus position on the illumination wavelength of ambient light and the spectral reflectance of a subject when images of visible light and infrared light are shot.

According to the present invention, provided is an image capturing apparatus comprising: an image sensor that is sensitive to light in a first wavelength band and light in a second wavelength band, the light being incident on the image sensor via an imaging optical system that includes a focus lens; an optical filter having a first filter region that selectively allows the passage of light in the first wavelength band therethrough, the optical filter being provided between the imaging optical system and the image sensor; and a calculation circuit that calculates an in-focus position of the focus lens based on a signal obtained from the image sensor, wherein the calculation circuit estimates a first component in the first wavelength band and a second component in the second wavelength band of light received by a second pixel region, based on a first signal obtained from a first pixel region and a second signal obtained from the second pixel region, the first pixel region being a region in a pixel region of the image sensor and being for receiving light that has passed through the first filter region, and the second pixel region being a region in the pixel region of the image sensor excluding the first pixel region, and calculates an in-focus position of the focus lens with respect to a predetermined shooting distance based on the estimated first component and the second component.

Further, according to the present invention, provided is a method for calculating an in-focus position of a focus lens based on a signal obtained from an image sensor of an image capturing apparatus that includes: the image sensor that is sensitive to light in a first wavelength band and light in a second wavelength band, the light being incident on the image sensor via an imaging optical system that includes the focus lens; and an optical filter having a first filter region that selectively allows the passage of light in the first wavelength band therethrough, the optical filter being provided between the imaging optical system and the image sensor, the method comprising: estimating a first component in the first wavelength band and a second component in the second wavelength band of light received by a second pixel region, based on a first signal obtained from a first pixel region and a second signal obtained from the second pixel region, the first pixel region being a region in a pixel region of the image sensor and being for receiving light that has passed through the first filter region, and the second pixel region being a region in the pixel region of the image sensor excluding the first pixel region; and calculating an in-focus position of the focus lens with respect to a predetermined shooting distance based on the first component and the second component.

Furthermore, according to the present invention, provided is a method for controlling an image capturing apparatus that includes: an image sensor that is sensitive to light in a first wavelength band and light in a second wavelength band, the light being incident on the image sensor via an imaging optical system that includes a focus lens; an optical filter having a first filter region that selectively allows the passage of light in the first wavelength band therethrough, the optical filter being provided between the imaging optical system and the image sensor; and a driving circuit that moves the optical filter on a plane perpendicular to an optical axis of the imaging optical system, the method comprising: driving, when in a first mode, the optical filter to a position at which the first filter region covers the entire pixel region of the image sensor, and driving, when in a second mode, the optical filter to a position at which the first filter region covers a portion of the pixel region; and estimating, when in the second mode, a first component in the first wavelength band and a second component in the second wavelength band of light received by a second pixel region, based on a first signal obtained from a first pixel region and a second signal obtained from the second pixel region, the first pixel region being a region in the pixel region and receiving light that has passed through the first filter region, and the second pixel region being a region in the pixel region excluding the first pixel region, and calculating an in-focus position of the focus lens with respect to a predetermined shooting distance, based on the estimated first component and second component.

Further, according to the present invention, provided is a method for controlling an image capturing apparatus that includes: an image sensor that is sensitive to light in a first wavelength band and light in a second wavelength band, the light being incident on the image sensor via an imaging optical system that includes a focus lens; an optical filter having a first filter region that selectively allows the passage of light in the first wavelength band therethrough, a second filter region that selectively allows the passage of light in the second wavelength band therethrough, and a third filter region that allows the passage of light in the first wavelength band and light in the second wavelength band therethrough, the optical filter being provided between the imaging optical system and the image sensor; and a driving circuit that moves the optical filter on a plane perpendicular to an optical axis of the imaging optical system, the method comprising: driving, when in a first mode, the optical filter to a position at which the first filter region covers the entire pixel region of the image sensor, and driving, when in a second mode, the optical filter to a position at which the first and second filter regions cover portions of the pixel region; and estimating, when in the second mode, a first component in the first wavelength band and a second component in the second wavelength band of light received by a third pixel region for receiving light that has passed through the third filter region, based on a first signal obtained from a first pixel region, and a second signal obtained from a second pixel region, the first pixel region being a region in the pixel region and being for receiving light that has passed through the first filter region, and the second pixel region being a region in the pixel region and being for receiving light that has passed through the second filter region, and calculating an in-focus position of the focus lens with respect to a predetermined shooting distance, based on the estimated first component and second component.

Further, according to the present invention, provided is a non-transitory storage medium readable by a computer, the storage medium storing a program that is executable by the computer, wherein the program includes program code for causing the computer to realize a method for calculating an in-focus position of a focus lens based on a signal obtained from an image sensor of an image capturing apparatus that includes: the image sensor that is sensitive to light in a first wavelength band and light in a second wavelength band, the light being incident on the image sensor via an imaging optical system that includes the focus lens; and an optical filter having a first filter region that selectively allows the passage of light in the first wavelength band therethrough, the optical filter being provided between the imaging optical system and the image sensor, the method comprising: estimating a first component in the first wavelength band and a second component in the second wavelength band of light received by a second pixel region, based on a first signal obtained from a first pixel region and a second signal obtained from the second pixel region, the first pixel region being a region in a pixel region of the image sensor and being for receiving light that has passed through the first filter region, and the second pixel region being a region in the pixel region of the image sensor excluding the first pixel region; and calculating an in-focus position of the focus lens with respect to a predetermined shooting distance based on the first component and the second component.

Further, according to the present invention, provided is a non-transitory storage medium readable by a computer, the storage medium storing a program that is executable by the computer, wherein the program includes program code for causing the computer to realize a method for controlling an image capturing apparatus that includes: an image sensor that is sensitive to light in a first wavelength band and light in a second wavelength band, the light being incident on the image sensor via an imaging optical system that includes a focus lens; an optical filter having a first filter region that selectively allows the passage of light in the first wavelength band therethrough, the optical filter being provided between the imaging optical system and the image sensor; and a driving circuit that moves the optical filter on a plane perpendicular to an optical axis of the imaging optical system, the method comprising: driving, when in a first mode, the optical filter to a position at which the first filter region covers the entire pixel region of the image sensor, and driving, when in a second mode, the optical filter to a position at which the first filter region covers a portion of the pixel region; and estimating, when in the second mode, a first component in the first wavelength band and a second component in the second wavelength band of light received by a second pixel region, based on a first signal obtained from a first pixel region and a second signal obtained from the second pixel region, the first pixel region being a region in the pixel region and receiving light that has passed through the first filter region, and the second pixel region being a region in the pixel region excluding the first pixel region, and calculating an in-focus position of the focus lens with respect to a predetermined shooting distance, based on the estimated first component and second component.

Further, according to the present invention, provided is a non-transitory storage medium readable by a computer, the storage medium storing a program that is executable by the computer, wherein the program includes program code for causing the computer to realize a method for controlling an image capturing apparatus that includes: an image sensor that is sensitive to light in a first wavelength band and light in a second wavelength band, the light being incident on the image sensor via an imaging optical system that includes a focus lens; an optical filter having a first filter region that selectively allows the passage of light in the first wavelength band therethrough, a second filter region that selectively allows the passage of light in the second wavelength band therethrough, and a third filter region that allows the passage of light in the first wavelength band and light in the second wavelength band therethrough, the optical filter being pro- vided between the imaging optical system and the image sensor; and a driving circuit that moves the optical filter on a plane perpendicular to an optical axis of the imaging optical system, the method comprising: driving, when in a first mode, the optical filter to a position at which the first filter region covers the entire pixel region of the image sensor, and driving, when in a second mode, the optical filter to a position at which the first and second filter regions cover portions of the pixel region; and estimating, when in the second mode, a first component in the first wavelength band and a second component in the second wavelength band of light received by a third pixel region for receiving light that has passed through the third filter region, based on a first signal obtained from a first pixel region, and a second signal obtained from a second pixel region, the first pixel region being a region in the pixel region and being for receiving light that has passed through the first filter region, and the second pixel region being a region in the pixel region and being for receiving light that has passed through the second filter region, and calculating an in-focus position of the focus lens with respect to a predetermined shooting distance, based on the estimated first component and second component.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 2A and 2B are conceptual diagrams that illustrate a configuration of an optical filter and a positional relationship between the optical filter and an image sensor according to the first embodiment.

FIG. 3 shows an example of a focus lens control table according to the first embodiment.

FIG. 6 shows an example of a focus lens control table according to the modification 4.

FIGS. 9A and 9B are conceptual diagrams that illustrate a configuration of an optical filter and a positional relationship between the optical filter and an image sensor according to the fourth embodiment.

DESCRIPTION OF THE EMBODIMENTS

Exemplary embodiments of the present invention will be described in detail in accordance with the accompanying drawings. The dimensions, materials, shapes and relative positions of the constituent parts shown in the embodiments should be changed as convenient depending on various conditions and on the structure of the apparatus adapted to the invention, and the invention is not limited to the embodiments described herein.

First Embodiment

Image Capturing Apparatus

Figure 1A:
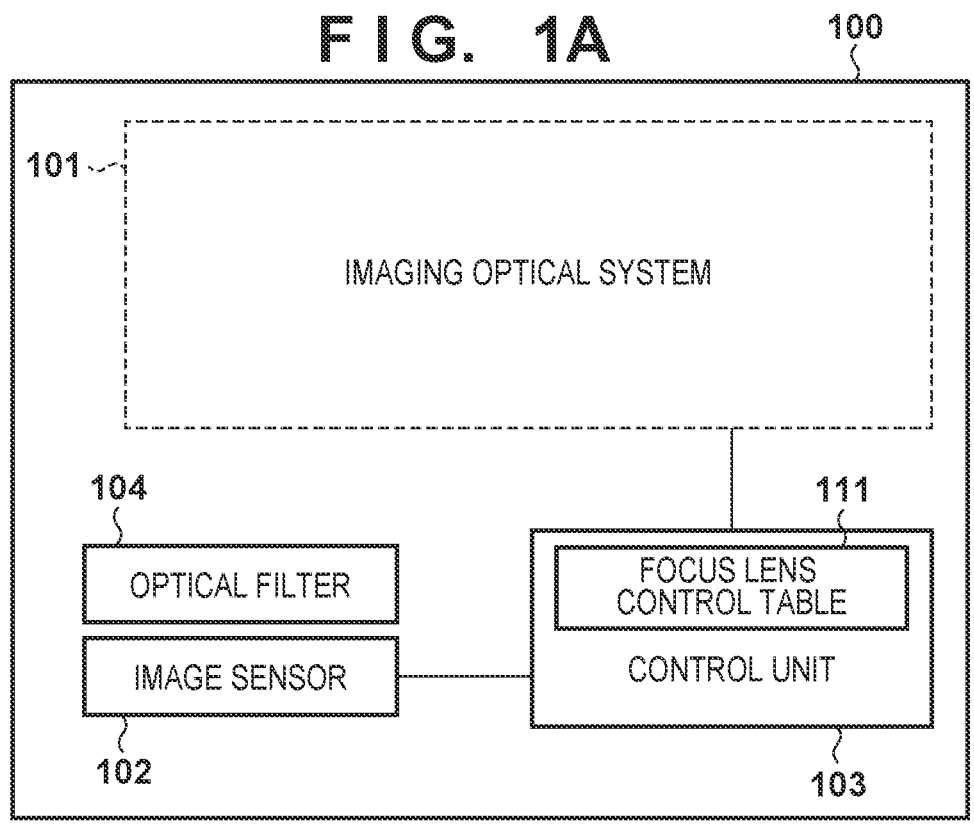
FIGS. 1A and 1B are block diagrams that show a schematic configuration of an image capturing apparatus according to first to third embodiments of the present invention.
Figure 1B:
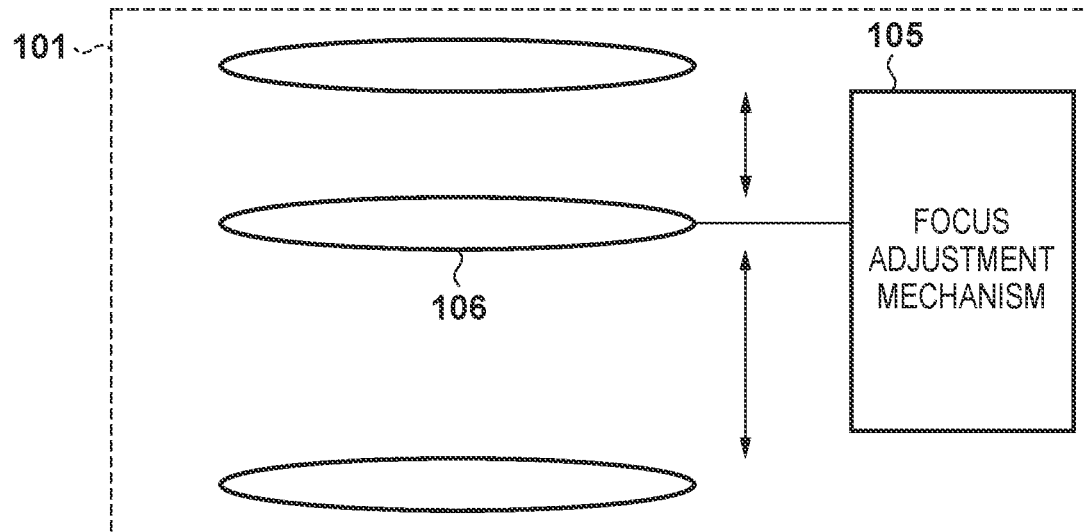

A schematic configuration of an image capturing apparatus according to the first embodiment of the present invention is shown in FIGS. 1A and 1B. In FIG. 1A, an image capturing apparatus 100 includes an imaging optical system 101, an image sensor 102, a control unit 103, and an optical filter 104, which is arranged on the imaging optical system 101 side (−z side) relative to the image sensor 102.

The image sensor 102 is arranged on an optical axis of the imaging optical system 101, and the imaging optical system 101 forms a subject image on the image sensor 102. The image sensor 102 is made of an inorganic semiconductor such as Si, InGaAs, or metal oxide, an organic semiconductor, or the like that has absorbability in at least a part of the wavelength band of visible light and in at least a part of the wavelength band of infrared light. Note that visible light means light with a wavelength from 380 nm to 750 nm, and infrared light means light with a wavelength from 750 nm to 2500 nm. "Having absorbability" means that the extinction coefficient is $1 \times 10^{-3}$ or more in a desired wavelength band. In the case of using Si, the absorption edge of Si is 1100 nm, and thus has absorbability in light in the entire wavelength band of visible light and infrared light with a wavelength from 750 nm to 1100 nm.

FIG. 1B is a schematic diagram that shows a configuration of the imaging optical system 101 according to this embodiment. The imaging optical system 101 has a focus adjustment mechanism 105 and a plurality of imaging lenses. An in-focus position of the imaging optical system 101 is adjusted by moving the position of a focus lens 106, which is included in the plurality of imaging lenses, in an optical axis direction (Z-axis direction) using the focus adjustment mechanism 105, which has a driving mechanism such as a stepping motor.

The control unit 103 controls the focus adjustment mechanism 105, drives the image sensor 102, reads out signals from the image sensor 102, and generates an image. Also, the control unit 103 holds a later-described focus lens control table 111.

FIGS. 2A and 2B illustrate a configuration of the optical filter 104 according to the first embodiment that is used in the image capturing apparatus 100 that has the above configuration, and a positional relationship between the optical filter 104 and the image sensor 102. FIG. 2A shows the optical filter 104 and the image sensor 102 as viewed from a +Y-axis direction, and FIG. 2B shows the image sensor 102 as viewed from a −Z-axis direction.

The optical filter 104 has a first filter region 107, which selectively allows the passage of visible light (first wavelength) that is included in a predetermined wavelength band therethrough, and selectively absorbs infrared light (second wavelength) that is included in a predetermined wavelength band that at least partially differs from that of visible light, and a second filter region 108, which allows the passage of both visible light and infrared light therethrough. The first filter region 107 is arranged so as to cover a portion of the image sensor 102. Here, in a pixel region 113 of the image sensor 102, a pixel region covered by the first filter region 107 will be called a first pixel region 109, and a pixel region covered by the second filter region 108 will be called a second pixel region 110. That is to say, pixels in the second pixel region 110 receives both visible light and infrared light, whereas pixels in the first pixel region 109 only receives visible light due to infrared light being absorbed by the first filter region 107.

In the first embodiments, in the control unit 103, the product of the illumination wavelength of ambient light and the spectral reflectance of a subject (wavelength of ambient light) is estimated based on a difference between the signal level of signals read out from pixels in the first pixel region 109 and the signal level of signals read out from pixels in the second pixel region 110. Then, the focus adjustment mechanism 105 is controlled using the estimation result and the focus lens control table 111. A detailed description will be given below.

FIG. 3 shows an example of the focus lens control table 111. In this embodiment, the control unit 103 holds the focus lens control table 111, which indicates a relationship between the distance (shooting distance) at which focus is to be placed and the position of the focus lens 106 that corresponds to the wavelength of ambient light. Specifically, the focus lens control table 111 has positions PVI of the focus lens 106 when visible light is incident on the imaging optical system 101, and positions PIR of the focus lens 106 when infrared light is incident on the imaging optical system 101, with respect to the shooting distances L.

Note that, if focus is to be placed at a distance between distances L listed in the focus lens control table 111, the positions PVI and PIR may be respectively obtained by performing interpolation between the positions PVI and between the positions PIR corresponding to the distances L before and after the desired distance in the focus lens control table 111, by means of linear interpolation or the like. Although FIG. 3 shows the case where the relationship between the shooting distance L and the positions PVI and PIR is held in the form of a table, the relationship may alternatively be held in the form of an expression, such as a polynomial.

Next, a method for estimating the wavelength of ambient light will be described. As mentioned above, the pixels in the first pixel region 109 only receive visible light, and the pixels in the second pixel region 110 receive both visible light and infrared light. Accordingly, if a first signal level of signals read out from the pixels in the first pixel region 109 is denoted as S1, and a second signal level of signals read out from the pixels in the second pixel region 110 is denoted as S2, the wavelength of ambient light can be estimated using Equations (1) and (2) below.

$$SVI = S1 \quad (1)$$

$$SIR = S2 - S1 \quad (2)$$

Here, SVI denotes a visible light component in the wavelength of ambient light, and SIR denotes an infrared light component in the wavelength of ambient light. That is to say, the visible light component (first component) and the infrared light component (second component) that are included in the wavelength of ambient light can be estimated using Equations (1) and (2). The first signal level S1 and the second signal level S2 may be signal levels at specific pixels in the first pixel region 109 and the second pixel region 110, or may be the average value or the median value of signal levels at a plurality of pixels. Note that the estimation accuracy increases if the average value or the median value of the signal levels at a plurality of pixels is used.

Figure 4A:
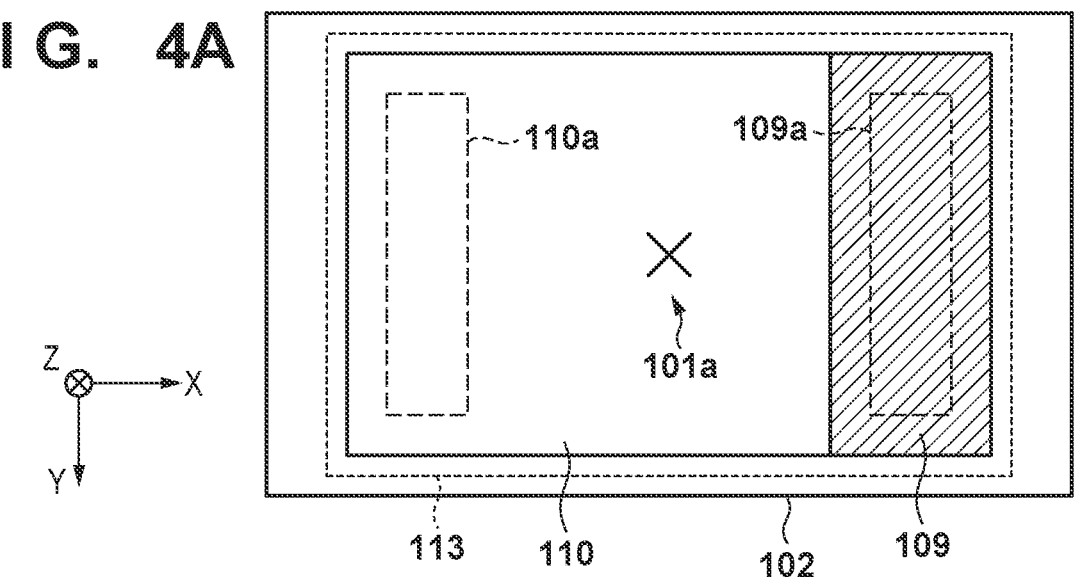
FIGS. 4A to 4C are schematic diagrams for illustrating examples of pixel regions that are used to calculate a signal level according to the first embodiment and modifications 1 and 2.

FIG. 4A is a schematic diagram for illustrating an example of a pixel region that includes a plurality of pixels to be used to calculate the signal levels according to the first embodiment. Ordinarily, an imaging optical system has a rotationally-symmetric image-forming capability with respect to its optical axis. Accordingly, so-called shading occurs, that is, the amount of light received by the pixels differs depending on the distance (image height) from the optical axis. For this reason, if the image height of a first wavelength estimation region 109a for obtaining the first signal level S1 is equal to the image height of a second wavelength estimation region 110a for obtaining the second signal level S2, the visible light component and the infrared light component in the wavelength of ambient light can be estimated more accurately. Note that it is assumed here that the image height of the first wavelength estimation region 109a and the image height of the second wavelength estimation region 110a are the image heights of the centroids of the respective regions. The image heights of these regions are allowed to have tolerance of about 10%.

Meanwhile, in an image sensor that is driven in a rolling shutter mode, charge accumulation in pixels and reading out of signals to peripheral circuits are performed sequentially from upper rows toward lower rows, using a vertical scanning circuit and horizontal control lines connected to the vertical scanning circuit. Thus, the exposure timing differs between pixels located in different rows (i.e. pixels with different Y coordinates). Especially, if, for example, fluorescent lighting is used as illumination of ambient light, and flicker is occurring, the amount of light received by the pixels differs between pixels located in different rows. Accordingly, if the coordinates (Y coordinates) of the first wavelength estimation region 109a and the second wavelength estimation region 110a in the direction in which pixel signals are read out are the same as shown in FIG. 4A, the visible light component and the infrared light component in the wavelength of ambient light can be estimated more accurately. Note that it is assumed here that the Y coordinates of the first wavelength estimation region 109a and the second wavelength estimation region 110a are the Y coordinates of the centroids of the respective regions.

Also, the smaller the difference in the wavelength in ambient light between the first wavelength estimation region 109a and the second wavelength estimation region 110a, the more accurately the wavelength of ambient light can be estimated. For this reason, it is conceivable to use portions that are estimated to be not of a main subject as the first wavelength estimation region 109a and the second wavelength estimation region 110a. Specifically, in the first pixel region 109 and the second pixel region 110, regions with a smaller contrast ratio of the signal levels between pixels are used as the wavelength estimation regions.

Next, a description will be given of a method for controlling the position of the focus lens 106 using the visible light component SVI and the infrared light component SIR that are included in the wavelength of ambient light and are estimated using Equations (1) and (2) above. As mentioned above, the focus lens control table 111 has the positions PVI of the focus lens for adjusting the in-focus position when visible light is incident, and the positions PIR of the focus lens for adjusting the in-focus position when infrared light is incident. In this embodiment, a weighted average of a position PVI and a position PIR for a shooting distance L is obtained based on the visible light component SVI and the infrared light component SIR in the wavelength of ambient light, as indicated by Equation (3). Then, the focus lens 106 is moved to the position of the obtained PMIX, and thus the dependency of the in-focus position on the wavelength of ambient light can be reduced.

$$PMIX=(PVI \times SVI + PIR \times SIR)/(SVI+SIR) \qquad (3)$$

As described above, according to the first embodiment, the dependency of the in-focus position on the illumination wavelength of ambient light and the spectral reflectance of a subject can be reduced by estimating the visible light component and the infrared light component in the wavelength of ambient light and controlling the position of the focus lens using the estimation result. Thus, the image quality can be improved.

Modification 1

Although FIGS. 2A and 2B show the case where the first pixel region 109 is provided along a side of the image sensor 102 in the +X direction, the arrangement of the first pixel region 109 and the second pixel region 110 is not limited to the arrangement shown in FIGS. 2A and 2B. However, it is preferable that the first filter region is provided along any one of the sides of the optical filter, since this configuration facilitates manufacturing of the optical filter.

Also, it is preferable that the ratio of the second pixel region 110 is greater in an effective pixel region 112, which is used to generate an image, in the pixel region 113 of the image sensor 102. The reason will be described below.

As mentioned above, the pixels in the second pixel region 110 receive both visible light and infrared light, whereas the pixels in the first pixel region 109 only receive visible light. Accordingly, the amount of light received by the pixels in the first pixel region 109 is smaller than the amount of light received by the pixels in the second pixel region 110. Commonly, the larger the amount of light received by a pixel, the higher the SN ratio of a pixel signal, and thus, the SN ratio of the pixel signals from the second pixel region 110 is higher than that of the pixel signals from the first pixel region 109. Accordingly, the quality of an image generated using the pixel signals from the second pixel region 110 is higher than the quality of an image generated using the pixel signals from the first pixel region 109. For this reason, it is more preferable that the ratio of the second pixel region 110 is greater in the effective pixel region 112. Especially, it is yet more preferable that the entire effective pixel region 112 is the second pixel region 110.

In other words, it is preferable that the ratio of the area covered by the first filter region 107 of the optical filter 104 is smaller in the effective pixel region 112 of the image sensor 102, and it is yet more preferable that the effective pixel region 112 is not covered by the first filter region 107.

As an example in which the image capturing apparatus 100 has a pixel region outside the effective pixel region 112, there are cases where the area of the pixel region 113 of the image sensor 102 is larger than the area of an image circle 101b of the imaging optical system 101. For example, in an omnidirectional camera, the region determined by the image circle 101b of the imaging optical system 101, in the rectangular pixel region 113 of the image sensor 102 is a circular effective pixel region 112, and the remaining region is the pixel region outside the effective pixel region 112.

Accordingly, in such an image capturing apparatus 100, the first filter region 107 of the optical filter 104 may be arranged so as to cover a region that includes four corners of the pixel region 113 and not to cover the effective pixel region 112 at the center.

Figure 4B:
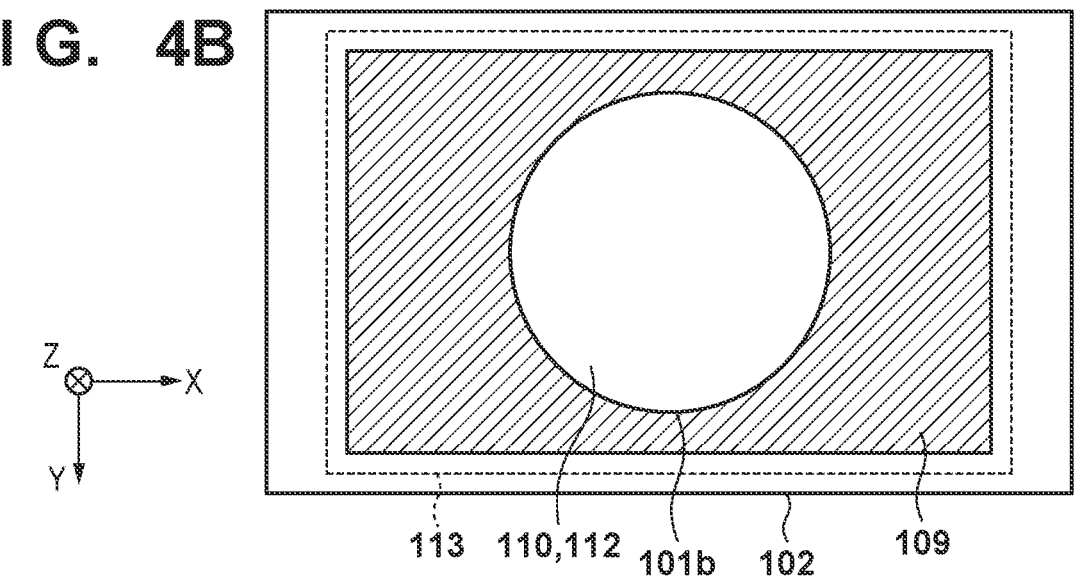

FIG. 4B shows an example in which a region that includes four corners of the pixel region 113, excluding the effective pixel region 112 at the center, is covered by the first filter region 107. With this configuration, the visible light component (first component) and the infrared light component (second component) that are included in the wavelength of ambient light can be estimated using pixel signals from the first pixel region 109, which is not used to generate an image, and pixel signals from the second pixel region 110, which is the effective pixel region 112. Also, in the effective pixel region 112, an image can be generated using pixel signals that are obtained with both visible light and infrared light. As a result, the dependency of the in-focus position on the illumination wavelength of ambient light and the spectral reflectance of a subject can be reduced, and the image quality can be improved.

Modification 2

The shooting conditions for the first pixel region 109 and the second pixel region 110 may be the same, or may differ. To reduce the calculation load of calculation of the difference between the first signal level S1 and the second signal level S2 in Equation (2), it is preferable that the shooting conditions for the first pixel region 109 and the second pixel region 110 are the same.

On the other hand, to increase the accuracy in estimation of the visible light component and the infrared light component in the wavelength of ambient light, it is preferable to change the shooting conditions between the first pixel region 109 and the second pixel region 110. The reason will be described below.

As mentioned above, the amount of light received by the pixels in the first pixel region 109 is smaller than the amount of light received by the pixels in the second pixel region 110. Accordingly, it is preferable that the exposure level in the first pixel region 109 is made higher than the exposure level of the second pixel region 110. Specifically, it is preferable that the accumulation time and analog gain of the pixels in the first pixel region 109 are made higher than the accumulation time and analog gain of the pixels in the second pixel region 110.

Figure 4C:
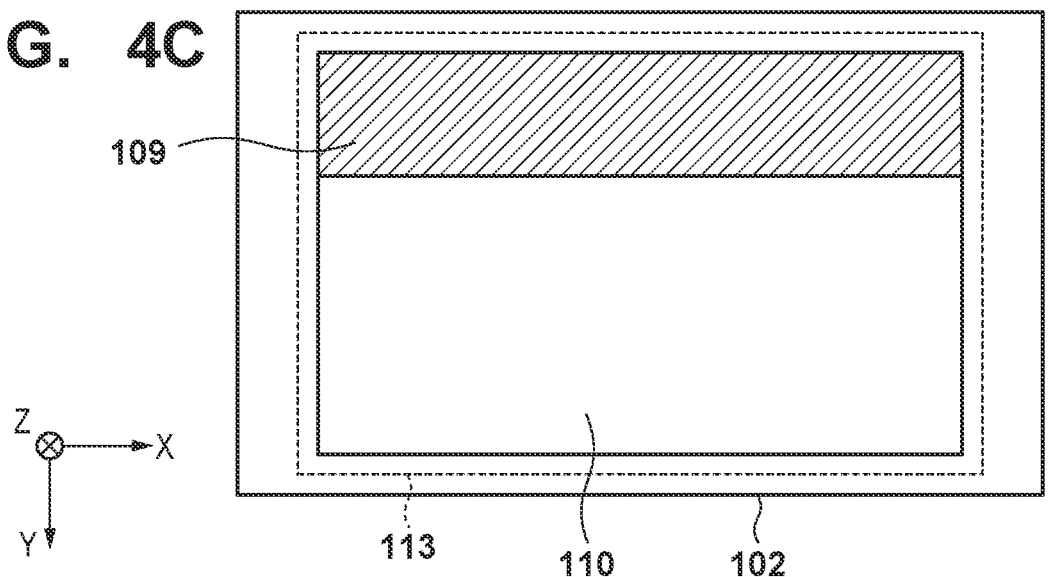

Especially, the arrangement shown in FIG. 4C is preferable in the case of changing the accumulation time of the pixels in the first pixel region 109 with respect to the accumulation time of the pixels in the second pixel region 110. That is to say, it is preferable that the boundary (X direction) between the first pixel region 109 and the second pixel region 110 is perpendicular to the direction (Y direction) in which pixel signals are read out in the image sensor 102. The reason will be described below.

As mentioned above, in the case of the rolling shutter mode, charges are accumulated in the pixels and signals are read out therefrom to a horizontal scanning circuit sequentially from upper rows to lower rows, using the horizontal control lines connected to the vertical scanning circuit. Accordingly, in the case of changing the accumulation time between pixels located in the same row (i.e. pixels at the same Y coordinate), horizontal control lines for controlling the timings of charge accumulation and signal readout for respective pixels are needed. As a result, the circuit scale increases, causing an increase in the manufacturing costs and deterioration of the yield. On the other hand, the accumulation time can be readily changed row-by-row between pixels located in different rows (i.e. pixel at different Y coordinates), since these pixels are connected to different horizontal control lines. For the above reason, the accumulation time can be more readily controlled if the boundary (X direction) between the first pixel region 109 and the second pixel region 110 of the optical filter 104 is perpendicular to the direction (Y direction) in which pixel signals are read out in the image sensor 102.

Modification 3

Although FIGS. 2A and 2B show the case where the optical filter 104 has the first filter region 107 and the second filter region 108, the optical filter 104 may alternatively have the first filter region 107 only, and the first filter region 107 may be arranged so as to cover a portion of the image sensor 102. In other words, a configuration may be employed in which the optical filter is made of a material that selectively allows the passage of visible light therethrough and selectively absorbs infrared light, and the optical filter 104 is arranged so as to cover a portion of the image sensor 102.

In the case of employing this configuration, only visible light is incident on the pixels in the first pixel region 109 that is covered by the optical filter, and the pixels in the second pixel region 110 that is not covered by the optical filter receive both visible light and infrared light. Accordingly, the wavelength of ambient light can be estimated by comparing the signal level of signals from the first pixel region 109 and the signal level of signals from the second pixel region 110, similarly to the case in FIGS. 2A and 2B.

Second Embodiment

Figure 5A:
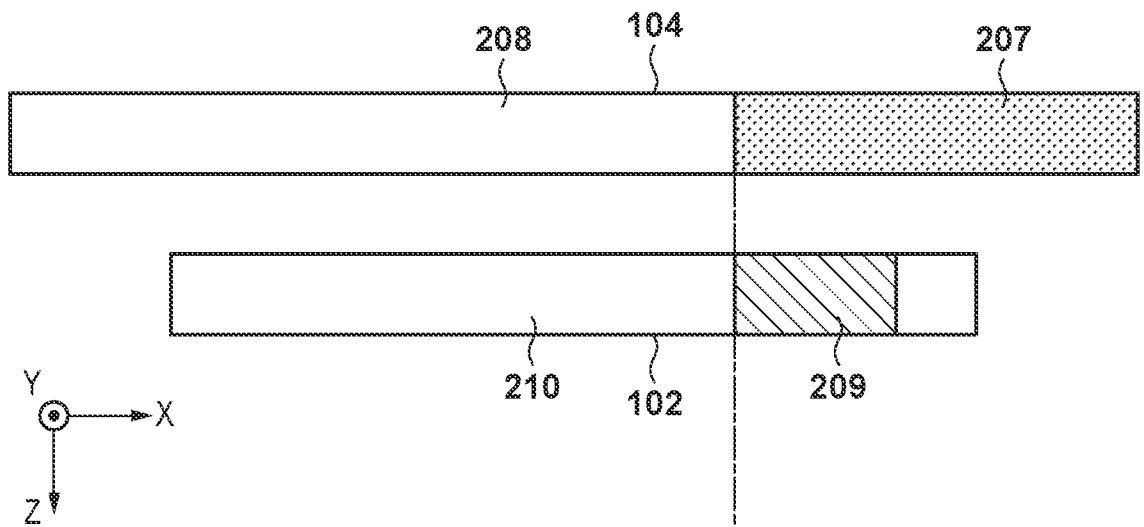
FIGS. 5A and 5B are conceptual diagrams that illustrate a configuration of an optical filter and a positional relationship between the optical filter and an image sensor according to the second embodiment and a modification 4.

Next, the second embodiment of the present invention will be described. Note that the configuration of the image capturing apparatus 100 according to the second embodiment is the same as that described in the first embodiment with reference to FIGS. 1A and 1B, and a description thereof is omitted here accordingly. FIG. 5A illustrates a configuration of the optical filter 104 according to the second embodiment and a positional relationship between the optical filter 104 and the image sensor 102 in the second embodiment, and shows the optical filter 104 and the image sensor 102 as viewed from the +Y-axis direction.

As shown in FIG. 5A, the optical filter 104 according to the second embodiment has a first filter region 207, which selectively allows the passage of infrared light therethrough and selectively absorbs visible light, and a second filter region 208, which allows the passage of both infrared light and visible light therethrough. The first filter region 207 is arranged so as to cover a portion of the image sensor 102, similarly to the arrangement shown in FIG. 2B in the first embodiment. Hereinafter, a pixel region covered by the first filter region 207 will be called a first pixel region 209, and a pixel region covered by the second filter region 208 will be called a second pixel region 210. That is to say, pixels in the second pixel region 210 receive both visible light and infrared light, whereas pixels in the first pixel region 209 only receives infrared light due to visible light being absorbed by the first filter region 207.

In the second embodiment as well, the wavelength of ambient light is estimated based on the difference between the signal level of signals read out from the pixels in the first pixel region 209 and the signal level of signals read out from pixels in the second pixel region 210. The focus adjustment mechanism is controlled using the estimation result and the focus lens control table 111. However, the configuration of the optical filter 104 according to the second embodiment differs from that of the first embodiment, and the method for estimating the wavelength of ambient light differs accordingly. If the signal level of signals read out from the pixels in the first pixel region 209 is denoted as S3, and the signal level of signals read out from the pixels in the second pixel region 110 is denoted as S4, the wavelength of ambient light can be estimated using Equations (4) and (5) below.

$$SIR = S3 \quad (4)$$

$$SVI = S4 - S3 \quad (5)$$

Here, SVI denotes the visible light component (first component) in the wavelength of ambient light, and SIR denotes the infrared light component (second component) in the wavelength of ambient light, similarly to the above-described Equations (1) and (2). Then, the focus lens 106 is driven to the position obtained using Equation (3), similarly to the above-described first embodiment, using the visible light component SVI and the infrared light component SIR that are estimated using Equations (4) and (5).

As described above, according to the second embodiment, the dependency of the in-focus position on the illumination wavelength of ambient light and the spectral reflectance of a subject can be reduced, and the image quality can be improved, similarly to the first embodiment.

Note that the arrangement of the first filter region 207 and the second filter region 208 is not limited to that shown in FIG. 5A. For example, the first filter region 207 and the second filter region 208 may alternatively be arranged so as to form the arrangements of the first pixel region 109 and the second pixel region 110 that has been described in the above modifications 1 to 3.

Modification 4

Figure 12:
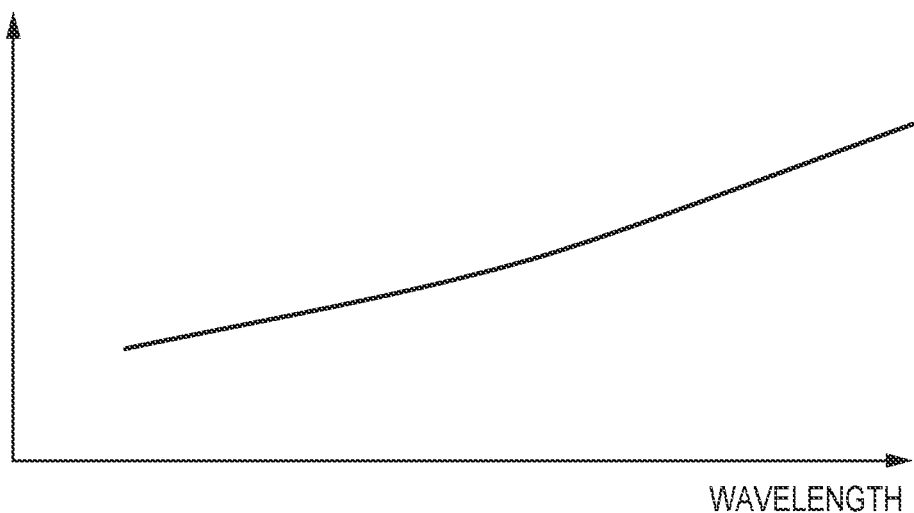
FIG. 12 shows an example of an axial chromatic aberration in an imaging optical system.

As shown in FIG. 12, the in-focus position differs depending on the wavelength, not only between visible light and infrared light but also within the infrared light band. Accordingly, the dependency of the in-focus position on the wavelength of ambient light can be reduced by estimating a wavelength distribution in the infrared light component as well as the visible light component (first component) and the infrared light component (second component) in the wavelength of ambient light, and controlling the position of the focus lens 106 in accordance with this estimation.

Figure 5B:
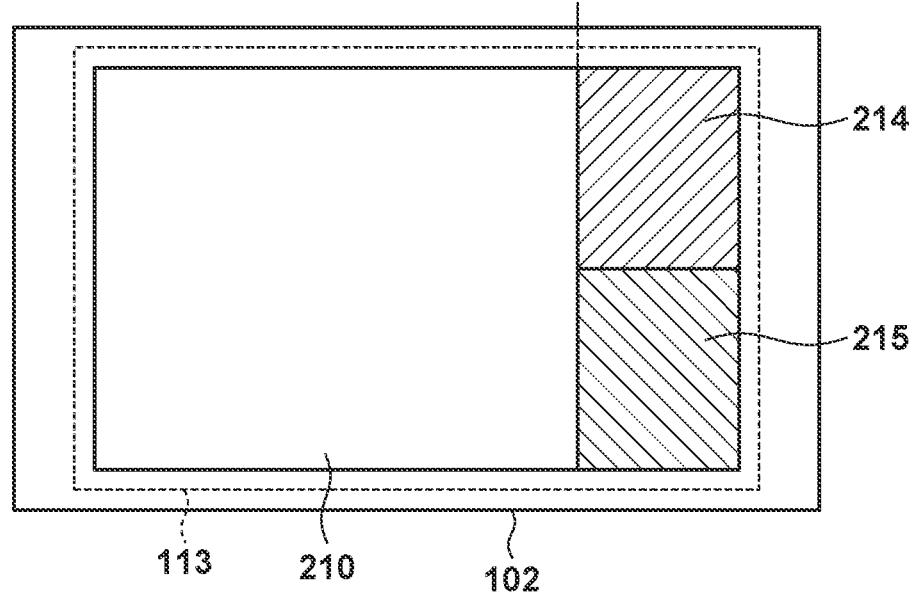

FIG. 5B shows the case where the first filter region 207 illustrated in FIG. 5A is divided into a third filter region, which selectively allows the passage of near-infrared light (less than 1100 nm) therethrough, and a fourth filter region, which selectively allows the passage of shortwave infrared light (1100 nm or more) therethrough. Note that, in the pixel region 113 of the image sensor 102, a pixel region covered by the second filter region 208 will be called a second pixel region 210, a pixel region covered by the third filter region will be called a third pixel region 214, and a pixel region covered by the fourth filter region will be called a fourth pixel region 215.

Here, a first signal level of signals read out from pixels in the third pixel region 214 is denoted as S5, and a third signal level of signals read out from pixels in the fourth pixel region 215 is denoted as S6. In this case, a near-infrared light component SNIR (first component) and a shortwave infrared light component SSWIR (third component) in the wavelength band of infrared light can be estimated in addition to the visible light component SVI (second component) in the wavelength of ambient light, using Equations (6), (7), and (8) below.

$$SNIR = S5 \quad (6)$$

$$SSWIR = S6 \quad (7)$$

$$SVI = S4 - S5 - S6 \tag{8}$$

FIG. 6 shows an example of the focus lens control table 111 according to the modification 4. In FIG. 6, positions PVI of the focus lens 106 when visible light is incident on the imaging optical system 101, positions PNIR when near-infrared light is incident thereon, and positions PSWIR when shortwave infrared light is incident thereon are provided with respect to shooting distances L.

PMIX is calculated using Equation (9) below, using an estimated near-infrared light component SNIR, shortwave infrared light component SSWIR, and visible light component SVI, as well as the focus lens control table 111. The dependency of the in-focus position on the wavelength of ambient light can be reduced by moving the focus lens 106 to the position of the calculated PMIX.

$$PMIX = (PVI \times SVI + PNIR \times SNIR + PSWIR \times SSWIR) \div (SVI + SNIR + SSWIR) \tag{9}$$

Although the example shown in FIG. 5B describes the case where the region that allows the passage of infrared light therethrough includes two regions, namely the region that selectively allows the passage of near-infrared light therethrough and the region that selectively allows the passage of shortwave infrared light therethrough, the region that allows the passage of infrared light therethrough may alternatively include three or more regions. Also, the region that allows the passage of infrared light therethrough may also include a plurality of regions that selectively allows the passage of infrared light having different forms of transmission spectra in the infrared band.

Third Embodiment

Figure 7A:
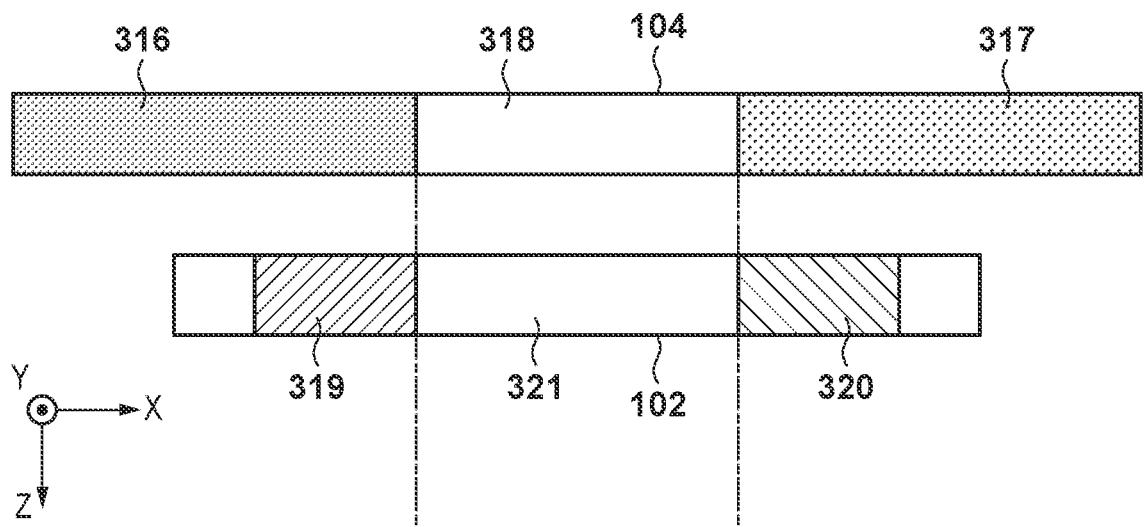
FIGS. 7A and 7B are conceptual diagrams that illustrate a configuration of an optical filter and a positional relationship between the optical filter and an image sensor according to the third embodiment.
Figure 7B:
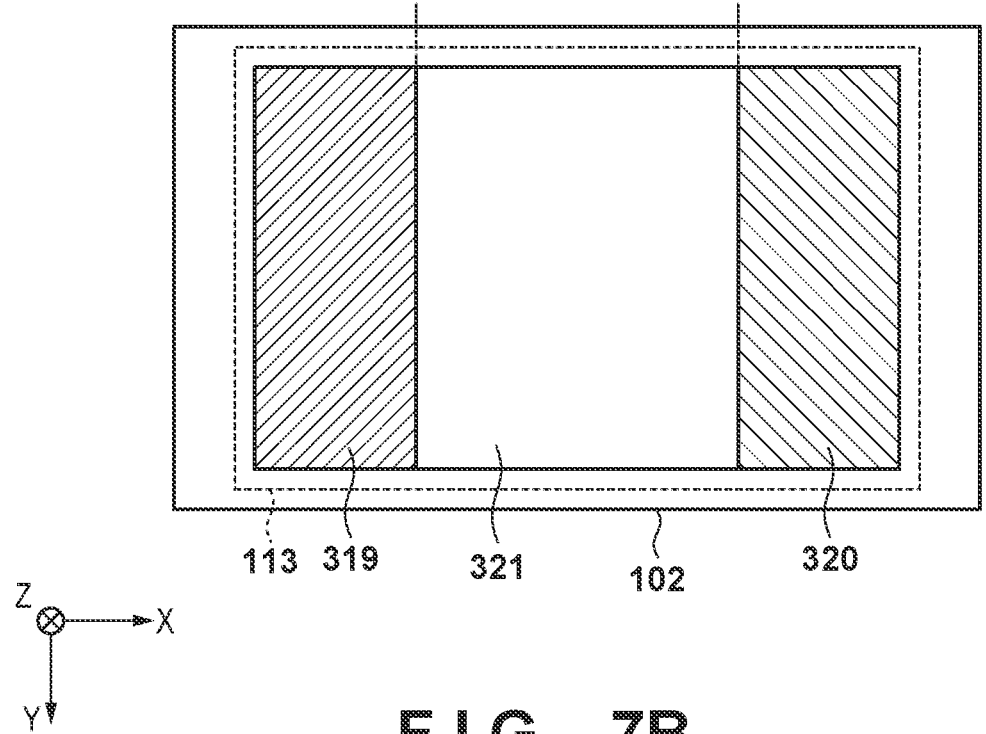

Next, the third embodiment of the present invention will be described. Note that the configuration of the image capturing apparatus 100 according to the third embodiment is the same as that described in the first embodiment with reference to FIGS. 1A and 1B, and a description thereof is omitted accordingly. FIGS. 7A and 7B illustrate a configuration of the optical filter 104 and a positional relationship between the optical filter 104 and the image sensor 102 according to the third embodiment. FIG. 7A shows the optical filter 104 and the image sensor 102 as viewed from the +Y-axis direction, and FIG. 7B shows the image sensor 102 as viewed from the −Z-axis direction.

As shown in FIGS. 7A and 7B, the optical filter 104 according to the third embodiment has a first filter region 316, which selectively absorbs infrared light and selectively allows the passage of visible light therethrough, a second filter region 317, which selectively absorbs visible light and selectively allows the passage of infrared light therethrough, and a third filter region 318, which allows the passage of visible light and infrared light therethrough. In the pixel region 113 of the image sensor 102, a pixel region covered by the first filter region 316 will be called a first pixel region 319, a pixel region covered by the second filter region 317 will be called a second pixel region 320, and a pixel region covered by the third filter region 318 will be called a third pixel region 321.

The image capturing apparatus 100 according to the third embodiment also estimates the wavelength of ambient light based on the difference between the signal levels of signals read out from pixels in the first to third pixel regions 319 to 321, similarly to the image capturing apparatus 100 according to the first and second embodiments. The focus adjustment mechanism 105 is controlled using the estimation result and the focus lens control table 111, similarly to the first embodiment. However, since the configuration of the optical filter 104 according to the third embodiment differs from that of the first and second embodiments, in the third embodiment, the wavelength of ambient light can be estimated as follows. That is to say, the first pixel region 319 only receives visible light, and the second pixel region 320 only receives infrared light. Accordingly, if the signal level of signals read out from the pixels in the first pixel region 319 is denoted as S7, and the signal level of signals read out from the pixels in the second pixel region 320 is denoted as S8, the estimation can be performed using Equations (10) and (11) below.

$$SVI = S7 \tag{10}$$

$$SIR = S8 \tag{11}$$

Thus, in the image capturing apparatus 100 according to the third embodiment, the visible light component and the infrared light component in the wavelength of ambient light can be estimated without obtaining the difference in the signal level between a plurality of pixel regions. Thus, the third embodiment can achieve a reduction in the calculation load of the difference calculation, in addition to the same effects as those of the first and second embodiments.

Note that the arrangement of the image sensor 102 and the optical filter 104 is not limited to the arrangement shown in FIGS. 7A and 7B. However, as mentioned above, it is preferable that the distances from the optical axis of the imaging optical system to the first pixel region 319 and to the second pixel region 320 coincide with each other, from the viewpoint of shading in the imaging optical system.

Fourth Embodiment

Next, the fourth embodiment of the present invention will be described.

Image Capturing Apparatus

Figure 8:
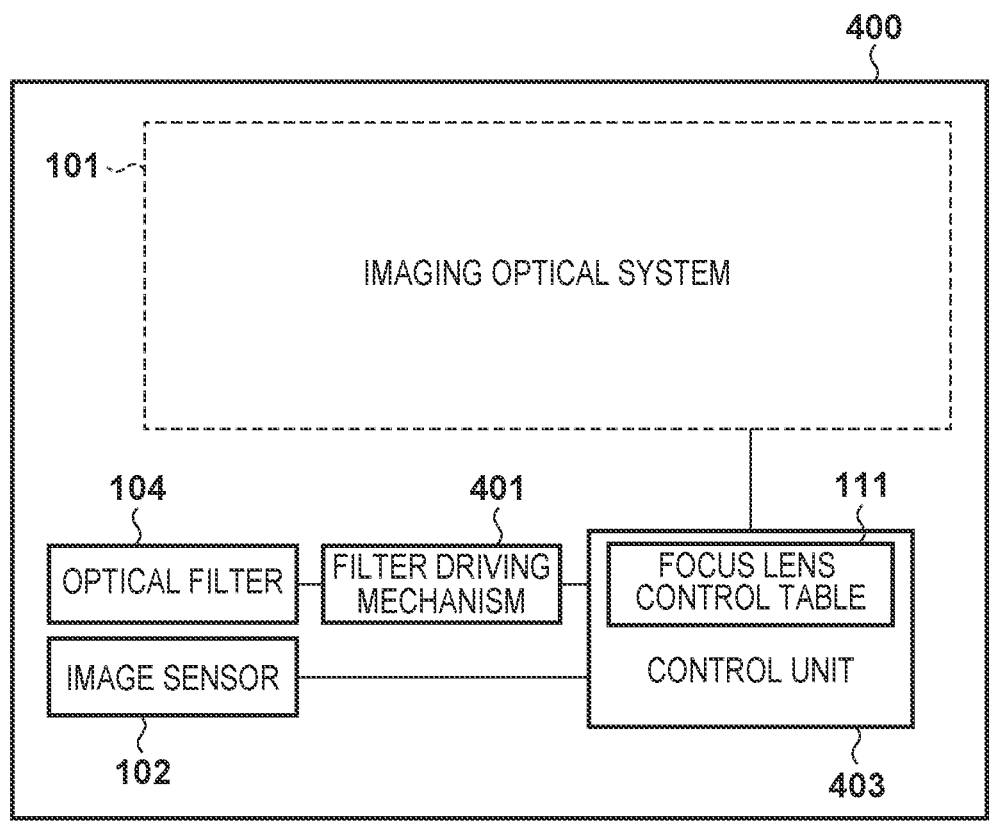
FIG. 8 is a block diagram that shows a schematic configuration of an image capturing apparatus according to fourth and fifth embodiments.

FIG. 8 is a block diagram that shows a schematic diagram of an image capturing apparatus 400 according to the fourth embodiment. Note that, in FIG. 8, the same elements as those in FIGS. 1A and 1B are assigned the same reference numerals, and a description thereof is omitted. The image capturing apparatus 400 differs from the image capturing apparatus 100 shown in FIGS. 1A and 1B in that the image capturing apparatus 400 has a filter driving mechanism 401 that moves the optical filter 104 on a plane perpendicular to the optical axis of the imaging optical system 101 based on the control performed by a control unit 403.

FIGS. 9A and 9B illustrates a configuration of the optical filter 104 and a positional relationship between the optical filter 104 and the image sensor 102 according to the fourth embodiment, and shows the optical filter 104 and the image sensor 102 as viewed from the +Y axis direction. The optical filter 104 according to the fourth embodiment has a first filter region 407, which selectively allows the passage of visible light therethrough and selectively absorbs infrared light, and a second filter region 408, which allows the passage of both visible light and infrared light therethrough.

Furthermore, the image sensor 102 according to the fourth embodiment has a plurality of types of color filters in the pixels, and can acquire a color image. Specifically, the image sensor 102 has pixels in a so-called RGB Bayer array. In the fourth embodiment, the shooting mode is switched between a shooting mode (day mode) of acquiring a color image and a shooting mode (night mode) in which a clear image can be acquired even in low light while color information is lost, by driving the optical filter 104.

Day Mode (First Mode)

When the image capturing apparatus 400 is used in the day mode, it is preferable to generate an image using pixels that only receive visible light, since the color reproducibility of a color image increases. Specifically, the first filter region 407 of the optical filter 104 may be arranged by the filter driving mechanism 401 so as to cover the entire pixel region 113 of the image sensor 102, as shown in FIG. 9A. In the case of this configuration, since the light received by the image sensor 102 can be restricted to visible light only, the visible light component (first component) and the infrared light component (second component) in the wavelength of ambient light need not be estimated. Accordingly, the position of the focus lens 106 need only be controlled at a position corresponding to the shooting distance, using information regarding the focus lens position when visible light is incident in the focus lens control table 111 shown in FIG. 3.

Note that the in-focus position also differs depending on the wavelength in the visible light band. Accordingly, the dependency of the in-focus position on the wavelength of ambient light may also be reduced by estimating the wavelength distribution in the visible light component in the wavelength of ambient light and controlling the position of the focus lens in accordance with the estimated wavelength distribution. Specifically, the wavelength distribution in the visible light component may be estimated based on the signal levels at R pixels, G pixels, and B pixels to control the position of the focus lens 106. In this case, information may be prepared, such as a focus lens control table or a polynomial that indicates the relationship between the position at which focus is to be placed and the wavelengths of R, G, and B, and a weighted average may be obtained.

Night Mode (Second Mode)

Meanwhile, when the image capturing apparatus 400 is used in the night mode, it is preferable to generate an image using pixels that receive both visible light and infrared light. In the case of generating an image using the pixels that receive both visible light and infrared light, the dependency of a shift in the in-focus position on the illumination wavelength of ambient light and the spectral reflectance of a subject is large, and therefore, the visible light component and the infrared light component in the wavelength of ambient light are estimated.

Specifically, the first filter region 407 and the second filter region 408 are arranged by the filter driving mechanism 401 so as to cover portions of the pixel region 113 of the image sensor 102, as shown in FIG. 9B. Then, the visible light component and the infrared light component in the wavelength of ambient light are estimated using the above-described Equations (1) and (2), using the first signal level S1 at the pixels in a first pixel region 409 that is covered by the first filter region 407, and the second signal level S2 at the pixels in a second pixel region 410 that is covered by the second filter region 408. The focus adjustment mechanism 105 is controlled using the estimation result and the focus lens control table 111, similarly to the first embodiment.

Note that, to achieve the arrangements in FIGS. 9A and 9B, various methods for arranging the first filter region 407 and the second filter region 408 and methods for driving the optical filter 104 are possible. Among these methods, a configuration is preferable in which the first filter region 407 and the second filter region 408 are arranged along the direction in which the optical filter 104 is driven (the X direction in the example shown in FIGS. 9A and 9B), and the filter driving mechanism 401 drives the first filter region 407 and the second filter region 408 in the direction in which these filter regions are arranged (the X direction in the example shown in FIGS. 9A and 9B). By employing this configuration, it is possible to simplify the mechanism for driving the optical filter, and also to switch between the day mode of only acquiring visible light and the night mode of estimating the visible light component and the infrared light component in the wavelength of ambient light.

As described above, the fourth embodiment enables an image with higher color reproducibility to be obtained in the day mode, in addition to the same effects as those of the first embodiment.

Fifth Embodiment

Next, the fifth embodiment of the present invention will be described. Note that the schematic configuration of the image capturing apparatus 400 according to the fifth embodiment is the same as that described in the fourth embodiment with reference to FIG. 8, and a description thereof is omitted here accordingly.

Figure 10A:
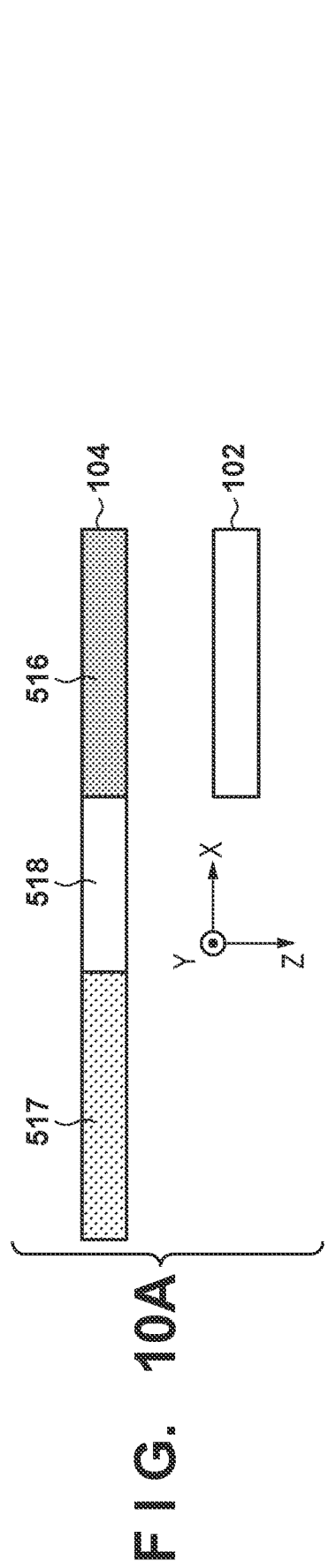
FIGS. 10A to 10C are conceptual diagrams that illustrate a configuration of an optical filter and a positional relationship between the optical filter and an image sensor according to the fifth embodiment.
Figure 10B:
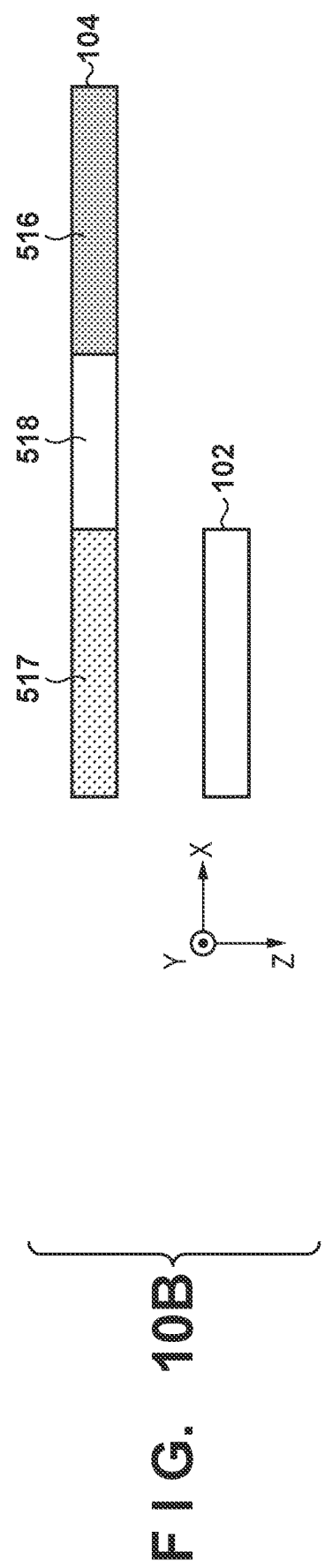
Figure 10C:
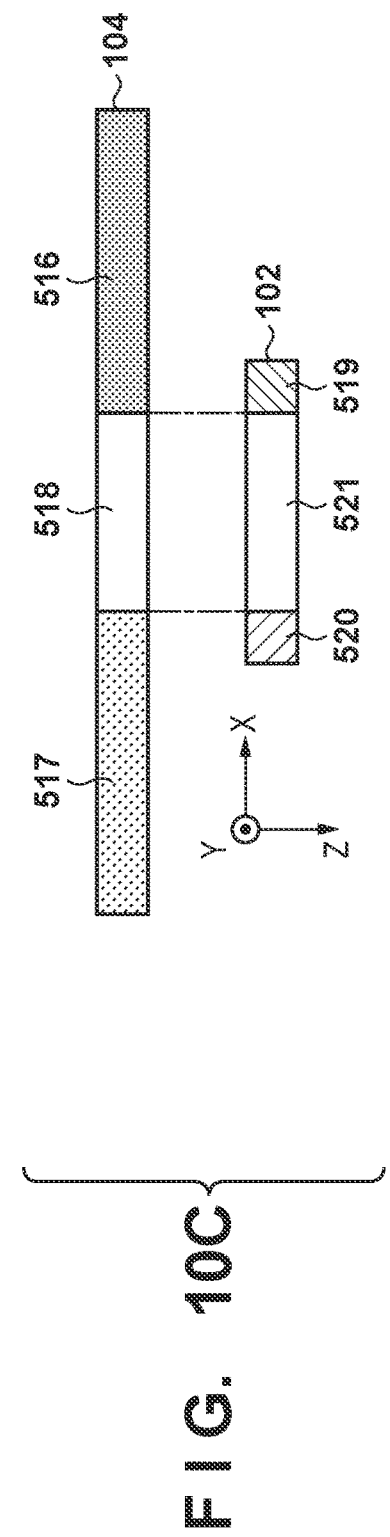

FIGS. 10A to 10C illustrates a configuration of the optical filter 104 and the arrangement of the optical filter 104 and the image sensor 102 according to the fifth embodiment, and shows the optical filter 104 and the image sensor 102 as viewed from the +Y axis direction. The optical filter 104 according to the fifth embodiment has a first filter region 516, which selectively absorbs infrared light and selectively allows the passage of visible light therethrough, a second filter region 517, which selectively absorbs visible light and selectively allows the passage of infrared light therethrough, and a third filter region 518, which allows the passage of visible light and infrared light therethrough.

The shooting mode of the image capturing apparatus 400 according to the fifth embodiment can be switched to a shooting mode (infrared mode) in which a clear image of a subject at a far distance can be acquired, in addition to the day mode and the night mode, by driving the optical filter 104 shown in FIGS. 10A to 10C.

Day Mode (First Mode)

When the image capturing apparatus 400 is used in the day mode, the optical filter 104 is arranged such that the entire pixel region 113 of the image sensor 102 is covered by the first filter region 516, as shown in FIG. 10A. In this case, the position of the focus lens 106 is controlled similarly to the case of the day mode in the fourth embodiment.

Infrared Mode (Third Mode)

When the image capturing apparatus 400 is used in the infrared mode, the optical filter 104 is arranged such that the entire pixel region 113 of the image sensor 102 is covered by the second filter region 517, as shown in FIG. 10B. This arrangement makes it possible to restrict the light received by the image sensor 102 to infrared light only. Accordingly, the position of the focus lens 106 need only be controlled at a position corresponding to the shooting distance, using information regarding the focus lens position when infrared light is incident in the focus lens control table 111 shown in FIG. 3.

Commonly, scattering of infrared light, which has a longer wavelength, due to smoke or fog in the air is smaller than that of visible light, and accordingly, an image of a subject at a far distance can be shot more clearly in a captured image obtained using infrared light only, than in a captured image obtained using visible light only. Accordingly, a clear image of a subject at a far distance can be acquired by restricting the light received by the image sensor to infrared light only, using the infrared mode.

Night Mode (Second Mode)

When the image capturing apparatus 400 is used in the night mode, the first filter region 516, the second filter region 517, and the third filter region 518 are arranged so as to cover the pixel region 113 of the image sensor 102 as shown in FIG. 10C. Then, the visible light component (first component) and the infrared light component (second component) in the wavelength of ambient light are estimated using pixel signals from the first pixel region 519 that is covered by the first filter region 516 and the second pixel region 520 that is covered by the second filter region 517, similarly to the third embodiment. Then, the position of the focus lens 106 is controlled as described in the third embodiment.

As described above, the fifth embodiment enables acquisition of a clear image of a subject at a far distance by selectively receiving infrared light only, in addition to the same effects as those of the fourth embodiment.

Modification 5

Furthermore, the image capturing apparatus 400, when in the night mode, may also estimate a wavelength distribution in the infrared light component, using a difference in spectral sensitivity characteristics of the R pixels, G pixels, and B pixels in the image sensor 102 in the wavelength band of infrared light.

Figure 11:
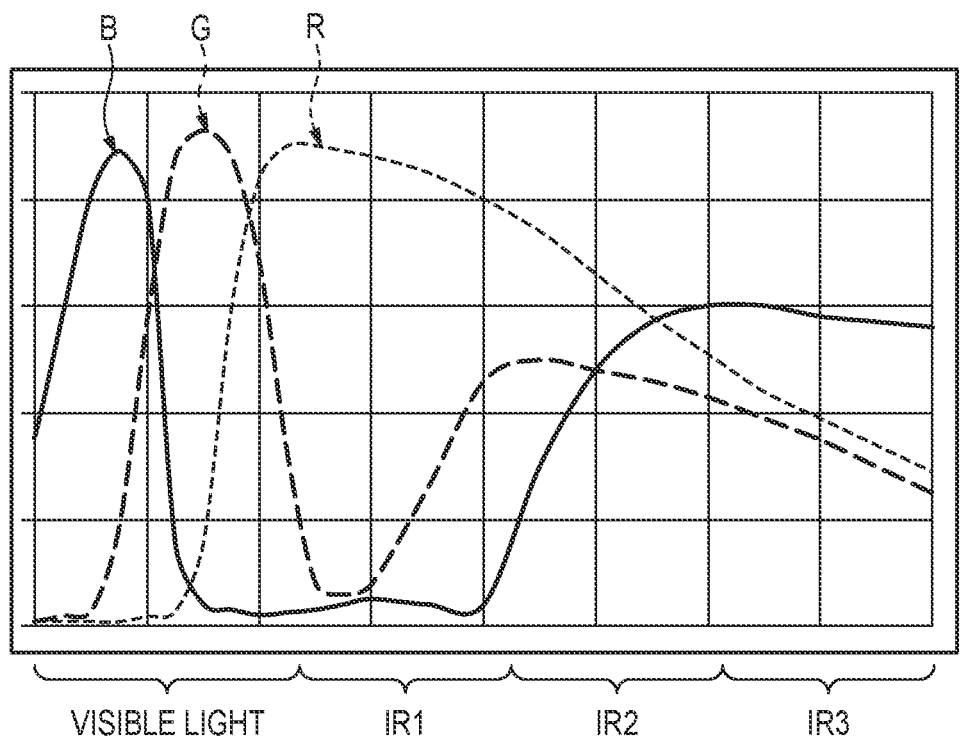
FIG. 11 shows spectral sensitivity characteristics of pixels in an image sensor according to a modification 5.

FIG. 11 shows respective spectral sensitivity of R, G, and B pixels in the image sensor 102 according to the modification 5. As is understood from FIG. 11, the R pixels are most sensitive to infrared light IR1 with shorter wavelengths, and the B pixels is most sensitive to infrared light IR3 with longer wavelengths, in the wavelength band of infrared light. Also, all pixels are sensitive to infrared light IR2 with wavelengths between infrared light IR1 and infrared light IR3 to the same degree.

The spectral sensitivity shown in FIG. 11 is determined by the material and configuration of photoelectric converters in the image sensor 102, and physical properties of color filter materials used in the RGB pixels. Note that the spectral sensitivity of the pixels in the wavelength band of infrared light can be controlled more accurately by mixing coloring matter that has absorbability in a specific wavelength band in infrared light in the color filters.

As already mentioned in the modification 4, the wavelength distribution in the infrared light component in the wavelength of ambient light can also be estimated using signals from a plurality of pixels with different spectral sensitivities in the wavelength band of infrared light. Furthermore, the dependency of the in-focus position on the wavelength of ambient light can be reduced by controlling the position of the focus lens in accordance with the estimation result.

The signal levels of signals from the R pixels, G pixels, and B pixels in the second pixel region 520 in FIG. 10C are denoted as SvR, SvG, and SvB, respectively. The pixel sensitivities of the R, G, and B pixels in the wavelength band IR1 shown in FIG. 11 are denoted respectively as Rir1, Gir1, and Bir1, the pixel sensitivities of the R, G, and B pixels in the wavelength band IR2 are denoted respectively as Rir2, Gir2, and Bir2, and the pixel sensitivities of the R, G, and B pixels in the wavelength band IR3 are denoted respectively as Rir3, Gir3, and Bir3. At this time, of the infrared light in the wavelength of ambient light, the components Sir1, Sir2, and Sir3 in the wavelength bands IR1, IR2, and IR3 can be estimated using Equation (12) below.

$$\begin{pmatrix} Sir1 \\ Sir2 \\ Sir3 \end{pmatrix} = \begin{pmatrix} Rir1 & Rir2 & Rir3 \\ Gir1 & Gir2 & Gir3 \\ Bir1 & Bir2 & Bir3 \end{pmatrix}^{-1} \begin{pmatrix} SvR \\ SvG \\ SvB \end{pmatrix} \quad (12)$$

Note that the above description has described an example of reducing the dependency of the in-focus position on the wavelength of ambient light in the night mode by estimating the wavelength distribution in the infrared light component in the night mode, but the same method may also be used in the infrared mode. In the case of using this method in the infrared mode as well, the components Sir1, Sir2, and Sir3 in the wavelength bands IR1, IR2, and IR3 of infrared light in the wavelength of ambient light can be estimated using Equation (12), based on the signal levels of signals from the RGB pixels in the region covered by the second filter region 517. As a result, the dependency of the in-focus position on the wavelength of ambient light can be reduced in the infrared mode as well.

Modification 6

In the first to third embodiments, an image in the effective pixel region in an image acquired to estimate the wavelength of ambient light is also used as a captured image. However, in the case where a mechanism for driving the optical filter 104 is provided as in the fourth and fifth embodiments, the position of the optical filter may be changed for between a frame for estimating the wavelength and a frame for acquiring a captured image.

For example, in the fourth embodiment, in a frame for estimating the wavelength of ambient light, the first filter region 407 and the second filter region 408 are arranged so as to cover portions of the pixel region 113 of the image sensor 102. On the other hand, in a frame for acquiring a captured image in the night mode, the first filter region 407 is arranged such that the effective pixel region of the image sensor 102 is not covered by the first filter region 407. By employing this configuration, the SN ratio of the captured image can be improved while estimating the wavelength of ambient light in the night mode.

Similarly, in the fifth embodiment, in a frame for estimating the wavelength of ambient light, the first filter region 516, the second filter region 517, and the third filter region 518 are arranged so as to cover the pixel region 113 of the image sensor 102. On the other hand, in a frame for acquiring a captured image in the night mode, the first filter region 516 and the second filter region 517 of the optical filter are arranged such that the effective pixel region of the image sensor 102 is not covered thereby. By employing this configuration, the SN ratio of the captured image can be improved while estimating the wavelength of ambient light in the night mode, which is preferable.

Thus, in the case where a frame for estimating the wavelength of ambient light is provided separately from a frame for acquiring a captured image, the driving mode for the image sensor 102 can also be changed between the frames. For example, in a frame for acquiring a captured image, signals are read out from all of the pixels in the image sensor 102 in order to acquire a high-resolution captured image. On the other hand, since the resolution is not required in the mode of estimating the wavelength of ambient light, pixels to be read out can be thinned out to reduce power consumption and increase the frame rate.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-226720, filed on Dec. 3, 2018 which is hereby incorporated by reference herein in its entirety.

What is claimed is:

1. An image capturing apparatus comprising:
an image sensor that is sensitive to light in a first wavelength band and light in a second wavelength band, the light being incident on the image sensor via an imaging optical system that includes a focus lens;
an optical filter having a first filter region that selectively allows the passage of light in the first wavelength band therethrough, the optical filter being provided between the imaging optical system and the image sensor; and
a calculation circuit that calculates an in-focus position of the focus lens based on a signal obtained from the image sensor,
wherein the calculation circuit estimates a first component in the first wavelength band and a second component in the second wavelength band of light received by a second pixel region, based on a first signal obtained from a first pixel region and a second signal obtained from the second pixel region, the first pixel region being a region in a pixel region of the image sensor and being for receiving light that has passed through the first filter region, and the second pixel region being a region in the pixel region of the image sensor excluding the first pixel region, and calculates an in-focus position of the focus lens with respect to a predetermined shooting distance based on the estimated first component and the second component.

2. The image capturing apparatus according to claim 1, wherein the calculation circuit has information indicating a relationship between a plurality of shooting distances and in-focus positions of the focus lens for light in the first wavelength band and light in the second wavelength band with respect to the respective shooting distances, and calculates an in-focus position of the focus lens by obtaining, using the first component and the second component, a weighted average of in-focus positions of the focus lens for light in the first wavelength band and light in the second wavelength band with respect to the predetermined shooting distance.

3. The image capturing apparatus according to claim 1, wherein the calculation circuit takes the first signal as the first component, and estimates the second component by subtracting the first signal from the second signal.

4. The image capturing apparatus according to claim 1, wherein the optical filter further has a second filter region that allows the passage of light in the first wavelength band and light in the second wavelength band therethrough, and the second pixel region receives light that has passed through the second filter region.

5. The image capturing apparatus according to claim 1, wherein the first wavelength band is a wavelength band of visible light, and the second wavelength band is a wavelength band of infrared light.

6. The image capturing apparatus according to claim 5, further comprising
a driving circuit that moves the optical filter on a plane perpendicular to an optical axis of the imaging optical system,
wherein the first wavelength band is a wavelength band of visible light, and the second wavelength band is a wavelength band of infrared light,
the driving circuit drives, when in a first mode, the optical filter to a position at which the first filter region covers the entire pixel region, and drives, when in a second mode, the optical filter to a position at which the first filter region covers a portion of the pixel region, and
the calculation circuit calculates an in-focus position of the focus lens when in the second mode.

7. The image capturing apparatus according to claim 6, wherein the driving circuit drives the optical filter such that the position of the optical filter differs between a predetermined first frame and a second frame different from the first frame, in the second mode.

8. The image capturing apparatus according to claim 1, wherein the first wavelength band is a wavelength band of infrared light, and the second wavelength band is a wavelength band of visible light.

9. The image capturing apparatus according to claim 1, wherein the calculation circuit acquires the first signal and the second signal from pixels in pixel regions at the same image height, in the first pixel region and the second pixel region, respectively.

10. The image capturing apparatus according to claim 1, wherein the optical filter is rectangular, and the first filter region is provided along one side of the optical filter.

11. The image capturing apparatus according to claim 1, further comprising
a control circuit that controls exposure in the first pixel region and the second pixel region,
wherein the control circuit makes exposure in the first pixel region higher than exposure in the second pixel region.

12. The image capturing apparatus according to claim 1, wherein the first filter region is arranged so as to cover a region in the pixel region excluding an effective pixel region that is used to generate an image.

13. The image capturing apparatus according to claim 12, wherein the effective pixel region is a region determined by an image circle of the imaging optical system.

14. The image capturing apparatus according to claim 1, wherein the image sensor is further sensitive to light in a third wavelength band,
the first wavelength band is a wavelength band of near-infrared light, the second wavelength band is a wavelength band of visible light, and the third wavelength band is a wavelength band of shortwave infrared light,
the optical filter further has a second filter region that selectively allows the passage of light in the third wavelength band therethrough, and
the calculation circuit obtains the second signal from the second pixel region that is a pixel region excluding the first pixel region and a third pixel region for receiving light that has passed through the second filter region, further estimates a first component in the first wavelength band, a second component in the second wavelength band, and a third component in the third wavelength band of light received by the second pixel region, based on a third signal obtained from the third pixel region, and calculates an in-focus position of the focus lens with respect to a predetermined shooting distance based on the estimated first component, second component, and third component.

15. The image capturing apparatus according to claim 14, wherein the calculation circuit has information indicating a relationship between a plurality of shooting distances and in-focus positions of the focus lens for light in the first wavelength band, light in the second wavelength band, and light in the third wavelength band with respect to the respective shooting distances, and calculates an in-focus position of the focus lens by obtaining, using the first component, the second component, and the third component, a weighted average of in-focus positions of the focus lens for light in the first wavelength band, light in the second wavelength band, and light in the third wavelength band with respect to the predetermined shooting distance.

16. The image capturing apparatus according to claim 1, wherein the optical filter further has a second filter region that selectively allows the passage of light in the second wavelength band therethrough, and a third filter region that allows the passage of light in the first wavelength band and light in the second wavelength band therethrough, and
the second pixel region receives light that has passed through the second filter region.

17. The image capturing apparatus according to claim 16, further comprising
a driving circuit that moves the optical filter on a plane perpendicular to an optical axis of the imaging optical system,
wherein the first wavelength band is a wavelength band of visible light, and the second wavelength band is a wavelength band of infrared light,
the driving circuit drives, when in a first mode, the optical filter to a position at which the first filter region covers the entire pixel region, and drives, when in a second mode, the optical filter to a position at which the first and second filter regions cover portions of the pixel region, and
the calculation circuit calculates an in-focus position of the focus lens when in the second mode.

18. The image capturing apparatus according to claim 17, wherein the driving circuit drives, when in a third mode, the optical filter to a position at which the second filter region covers the entire pixel region.

19. The image capturing apparatus according to claim 17, wherein the driving circuit drives the optical filter such that the position of the optical filter differs between a predetermined first frame and a second frame different from the first frame, in the second mode.

20. The image capturing apparatus according to claim 16, wherein the calculation circuit acquires the first signal and the second signal from pixels in pixel regions at the same image height, in the first pixel region and the second pixel region, respectively.

21. The image capturing apparatus according to claim 16, wherein the optical filter is rectangular, and the first filter region is provided along one side of the optical filter.

22. The image capturing apparatus according to claim 16, further comprising
a control circuit that controls exposure in the first pixel region and the second pixel region,
wherein the control circuit makes exposure in the first pixel region higher than exposure in the second pixel region.

23. The image capturing apparatus according to claim 16, wherein the first filter region is arranged so as to cover a region in the pixel region excluding an effective pixel region that is used to generate an image.

24. A method for calculating an in-focus position of a focus lens based on a signal obtained from an image sensor of an image capturing apparatus that includes: the image sensor that is sensitive to light in a first wavelength band and light in a second wavelength band, the light being incident on the image sensor via an imaging optical system that includes the focus lens; and an optical filter having a first filter region that selectively allows the passage of light in the first wavelength band therethrough, the optical filter being provided between the imaging optical system and the image sensor, the method comprising:
estimating a first component in the first wavelength band and a second component in the second wavelength band of light received by a second pixel region, based on a first signal obtained from a first pixel region and a second signal obtained from the second pixel region, the first pixel region being a region in a pixel region of the image sensor and being for receiving light that has passed through the first filter region, and the second pixel region being a region in the pixel region of the image sensor excluding the first pixel region; and
calculating an in-focus position of the focus lens with respect to a predetermined shooting distance based on the first component and the second component.

25. A method for controlling an image capturing apparatus that includes: an image sensor that is sensitive to light in a first wavelength band and light in a second wavelength band, the light being incident on the image sensor via an imaging optical system that includes a focus lens; an optical filter having a first filter region that selectively allows the passage of light in the first wavelength band therethrough, the optical filter being provided between the imaging optical system and the image sensor; and a driving circuit that moves the optical filter on a plane perpendicular to an optical axis of the imaging optical system, the method comprising:
driving, when in a first mode, the optical filter to a position at which the first filter region covers the entire pixel region of the image sensor, and driving, when in a second mode, the optical filter to a position at which the first filter region covers a portion of the pixel region; and estimating, when in the second mode, a first component in the first wavelength band and a second component in the second wavelength band of light received by a second pixel region, based on a first signal obtained from a first pixel region and a second signal obtained from the second pixel region, the first pixel region being a region in the pixel region and receiving light that has passed through the first filter region, and the second pixel region being a region in the pixel region excluding the first pixel region, and calculating an in-focus position of the focus lens with respect to a predetermined shooting distance, based on the estimated first component and second component.

26. A method for controlling an image capturing apparatus that includes: an image sensor that is sensitive to light in a first wavelength band and light in a second wavelength band, the light being incident on the image sensor via an imaging optical system that includes a focus lens; an optical filter having a first filter region that selectively allows the passage of light in the first wavelength band therethrough, a second filter region that selectively allows the passage of light in the second wavelength band therethrough, and a third filter region that allows the passage of light in the first wavelength band and light in the second wavelength band therethrough, the optical filter being provided between the imaging optical system and the image sensor; and a driving circuit that moves the optical filter on a plane perpendicular to an optical axis of the imaging optical system, the method comprising:

driving, when in a first mode, the optical filter to a position at which the first filter region covers the entire pixel region of the image sensor, and driving, when in a second mode, the optical filter to a position at which the first and second filter regions cover portions of the pixel region; and estimating, when in the second mode, a first component in the first wavelength band and a second component in the second wavelength band of light received by a third pixel region for receiving light that has passed through the third filter region, based on a first signal obtained from a first pixel region, and a second signal obtained from a second pixel region, the first pixel region being a region in the pixel region and being for receiving light that has passed through the first filter region, and the second pixel region being a region in the pixel region and being for receiving light that has passed through the second filter region, and calculating an in-focus position of the focus lens with respect to a predetermined shooting distance, based on the estimated first component and second component.

27. A non-transitory storage medium readable by a computer, the storage medium storing a program that is executable by the computer, wherein the program includes program code for causing the computer to realize a method for calculating an in-focus position of a focus lens based on a signal obtained from an image sensor of an image capturing apparatus that includes: the image sensor that is sensitive to light in a first wavelength band and light in a second wavelength band, the light being incident on the image sensor via an imaging optical system that includes the focus lens; and an optical filter having a first filter region that selectively allows the passage of light in the first wavelength band therethrough, the optical filter being provided between the imaging optical system and the image sensor, the method comprising:

estimating a first component in the first wavelength band and a second component in the second wavelength band of light received by a second pixel region, based on a first signal obtained from a first pixel region and a second signal obtained from the second pixel region, the first pixel region being a region in a pixel region of the image sensor and being for receiving light that has passed through the first filter region, and the second pixel region being a region in the pixel region of the image sensor excluding the first pixel region; and calculating an in-focus position of the focus lens with respect to a predetermined shooting distance based on the first component and the second component.

28. A non-transitory storage medium readable by a computer, the storage medium storing a program that is executable by the computer, wherein the program includes program code for causing the computer to realize a method for controlling an image capturing apparatus that includes: an image sensor that is sensitive to light in a first wavelength band and light in a second wavelength band, the light being incident on the image sensor via an imaging optical system that includes a focus lens; an optical filter having a first filter region that selectively allows the passage of light in the first wavelength band therethrough, the optical filter being provided between the imaging optical system and the image sensor; and a driving circuit that moves the optical filter on a plane perpendicular to an optical axis of the imaging optical system, the method comprising:

driving, when in a first mode, the optical filter to a position at which the first filter region covers the entire pixel region of the image sensor, and driving, when in a second mode, the optical filter to a position at which the first filter region covers a portion of the pixel region; and estimating, when in the second mode, a first component in the first wavelength band and a second component in the second wavelength band of light received by a second pixel region, based on a first signal obtained from a first pixel region and a second signal obtained from the second pixel region, the first pixel region being a region in the pixel region and receiving light that has passed through the first filter region, and the second pixel region being a region in the pixel region excluding the first pixel region, and calculating an in-focus position of the focus lens with respect to a predetermined shooting distance, based on the estimated first component and second component.

29. A non-transitory storage medium readable by a computer, the storage medium storing a program that is executable by the computer, wherein the program includes program code for causing the computer to realize a method for controlling an image capturing apparatus that includes: an image sensor that is sensitive to light in a first wavelength band and light in a second wavelength band, the light being incident on the image sensor via an imaging optical system that includes a focus lens; an optical filter having a first filter region that selectively allows the passage of light in the first wavelength band therethrough, a second filter region that selectively allows the passage of light in the second wavelength band therethrough, and a third filter region that allows the passage of light in the first wavelength band and light in the second wavelength band therethrough, the optical filter being provided between the imaging optical system and the image sensor; and a driving circuit that moves the optical filter on a plane perpendicular to an optical axis of the imaging optical system, the method comprising:

driving, when in a first mode, the optical filter to a position at which the first filter region covers the entire pixel region of the image sensor, and driving, when in a second mode, the optical filter to a position at which the first and second filter regions cover portions of the pixel region; and estimating, when in the second mode, a first component in the first wavelength band and a second component in the second wavelength band of light received by a third pixel region for receiving light that has passed through the third filter region, based on a first signal obtained from a first pixel region, and a second signal obtained from a second pixel region, the first pixel region being a region in the pixel region and being for receiving light that has passed through the first filter region, and the second pixel region being a region in the pixel region and being for receiving light that has passed through the second filter region, and calculating an in-focus position of the focus lens with respect to a predetermined shooting distance, based on the estimated first component and second component.

\* \* \* \* \*